Feb. 2, 1971 W. E. HUGHES ET AL 3,560,184
APPARATUS FOR GAUGING THE POSITION OF A GLASS TUBE
Original Filed Nov. 18, 1965
FIG.1
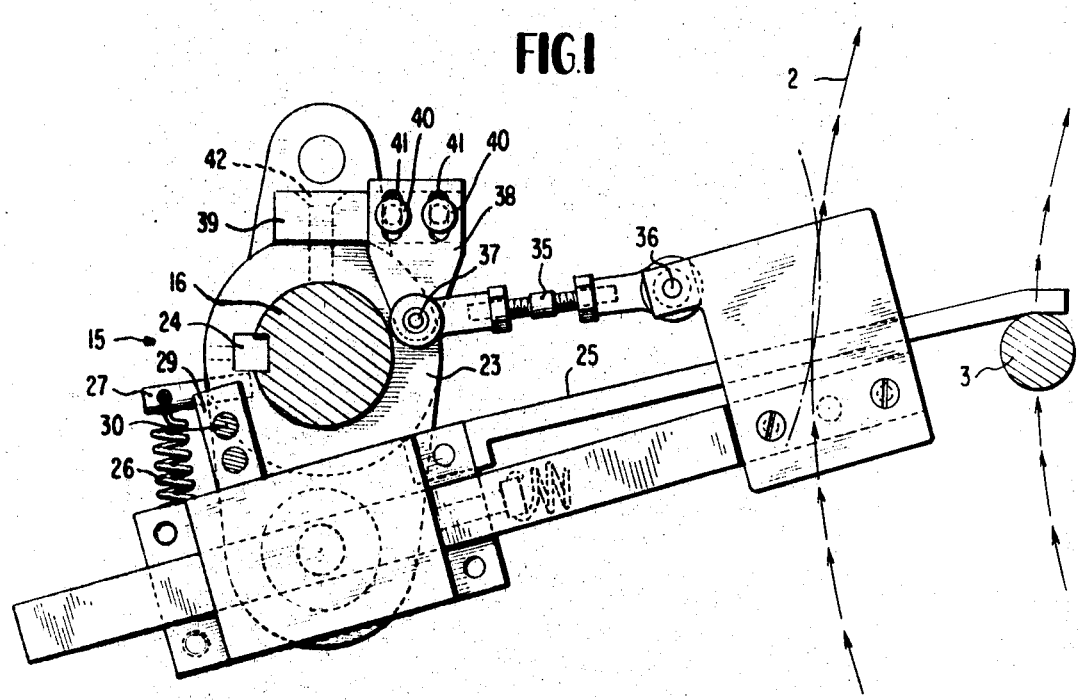
FIG.2
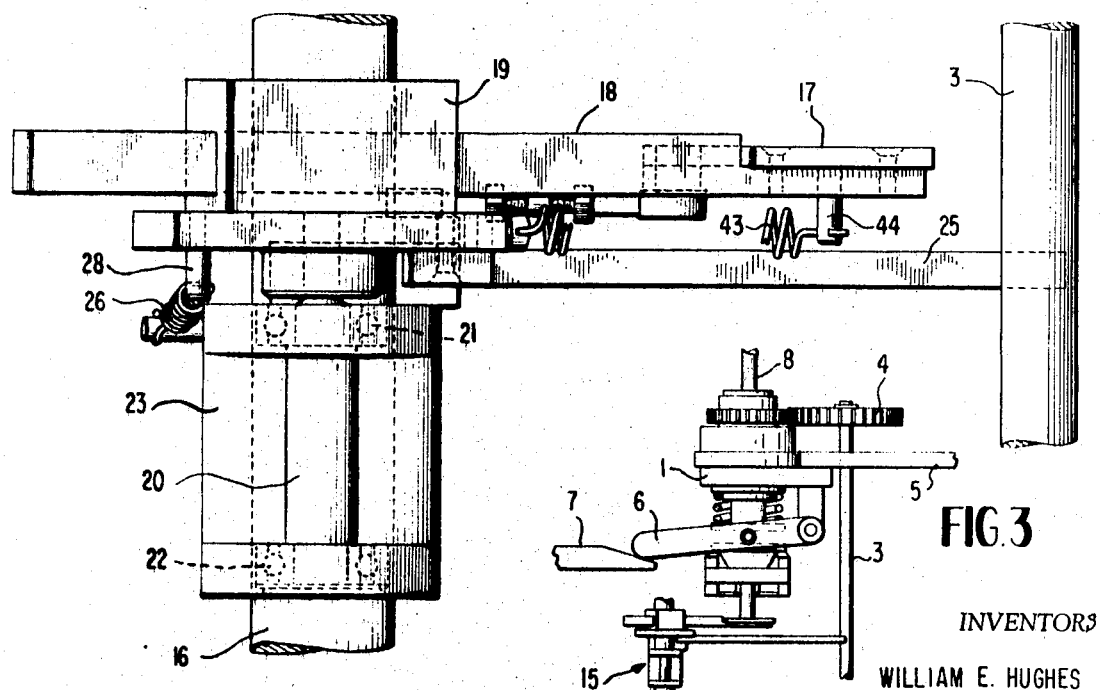
FIG.3
INVENTORS
WILLIAM E. HUGHES
CHARLES A. PORTER
BY E. J. Holler & W. A. Schaich
ATTORNEY

United States Patent Office 3,560,184
Patented Feb. 2, 1971

3,560,184
APPARATUS FOR GAUGING THE POSITION OF A GLASS TUBE
William E. Hughes and Charles A. Porter, Vineland, N.J., assignors to Owens-Illinois, Inc., a corporation of Ohio
Continuation of application Ser. No. 508,454, Nov. 18, 1965. This application May 14, 1969, Ser. No. 826,082
Int. Cl. C03b 23/12
U.S. Cl. 65—158                8 Claims

ABSTRACT OF THE DISCLOSURE

This application discloses an apparatus for gauging the length of a glass article which is useful in an ampule forming machine. The gauging plate is mounted in a manner which permits it to travel through substantially the same arcuate path as the tubing during the brief interval of receiving such tubing even though the gauging plate is pivotally mounted about an axis located radially outwardly from the tubing path of travel. The movement of the gauging plate through substantially the same path as the tubing for this brief interval reduces relative movement between the tubing and the gauging plate which occurs in conventional ampule machines, and which causes deformation to the tubing.

---

This is a continuation of application Ser. No. 508,454, filed Nov. 18, 1965, now abandoned.

This invention relates to apparatus for the manufacture of ampules, and more particularly to apparatus for supporting the end of a glass supply tube which has been temporarily released by the tube supporting chuck of an ampule manufacturing machine to gauge the length of the tube projecting beneath the chuck.

This invention is particularly adapted for use in an ampule machine of conventional construction in which a plurality of tube supporting chucks are rotated along a circular path past successive work stations, including a body length gauging station, at which various operations are performed on a glass supply tube to form successive ampules from segments of the tube severed from the lower end thereof. In the conventional operation of an ampule machine of this general type, the glass supply tube is temporarily released by the supply tube supporting chuck at a body length gauging station to permit the tube to drop, by gravity, through the chuck a distance required to provide the length of glass tube necessary to form the next successive ampule. A body length gauging plate is supported in a fixed position beneath the chuck in position to engage and support the lower end of the tube for the brief interval necessary for the chuck to re-engage the glass tube, and to assure that the exact length of tubing desired projects below the chuck.

Although the glass supply tube is supported on the body length gauging plate only for a very brief interval, the relative movement between the continuously moving chuck and the stationary body length gauging plate during this brief interval is sufficient to cause the glass tubing to tilt slightly within the chuck, particularly when the tube length has been nearly consumed. Since the bottom end of the glass tube is still soft from the previous ampule being burned from the bottom end of the tube, the closing of the chucks and the subsequent snapping of the glass tube back to the vertical position with the bottom of the tube in frictional contact with the gauging plate has, in the past, frequently caused the bottom of the tube to be deformed so that an ampule formed from this section is defective.

The body length gauging device according to this invention eliminates or greatly reduces the friction between the glass tube and the gauging plate to thereby reduce the tilting of the glass tube within the chuck and minimize the deformation of the glass tube upon closing of the chucks as a result of friction between the bottom of the tube and the gauging plate. This is accomplished by mounting the body length gauging plate for movement with the chuck along a path closely conforming to a segment of the circular path of the chuck. The body length gauging plate is supported for pivotal movement about an axis outside of and adjacent to the circular path of the chunk, and for simultaneous radial movement toward and away from the vertical axis.

Other features of the invention will become apparent by reference to the following specifications and to the drawings.

In the drawings:

FIG. 1 is a top plan view of a body length gauging device according to this invention;

FIG. 2 is an elevation view of the body length gauging device shown in FIG. 1; and FIG. 3 is a fragmentary elevation view showing the relationship between the body length gauging device and a tube supporting chuck of an otherwise conventional ampule making machine.

Since the body length gauging device of this invention is intended for use with an ampule forming machine of conventional construction, only that portion of the ampule machine necessary to illustrate the invention is shown in the drawings. Referring to the drawings in detail, it is seen that a chuck 1 is supported for movement around a circular path indicated generally by the arrows 2, and is driven for rotation about its own vertical axis by a vertically extending drive shaft 3, acting through suitable gearing 4. Shaft 3 and gearing 4 are supported for rotation with chuck 1 around its circular path by a spider 5. At the body length gauging station, chuck 1 is opened by a lever 6 carrier thereon which engages a fixed cam 7 to permit the glass supply tube 8 to fall by gravity into engagement with the body length gauging device 15. Chuck 1 is held open by cam 7 only long enough to assure that the tube is in contact with the gauging device, then the chuck is released to re-engage the tube.

Referring particularly to FIGS. 1 and 2, it is seen that the body length gauging mechanism 15 is supported on a rigid post 16 positioned radially outward from the circular path 2 of the tube supporting chuck. The body length gauging device 15 comprises a gauging plate 17 rigidly supported on an elongated arm 18 which, in turn, is supported for longitudinal sliding movement by a linear bearing 19. Linear bearing 19 includes a vertically extending shaft 20 which, in turn, is supported for rotation about a vertical axis by suitable bearings 21, 22 mounted in vertically spaced relation to one another by a suitable mounting bracket 23 rigidly fixed, as by key 24 on post 16. An elongated lever 25 is rigidly mounted on bearing 19 and extends outwardly therefrom beneath plate 17 into the path of drive shaft 3 so that movement of the chuck 1 and drive shaft 3 about their circular path will bring drive shaft 3 into engagement with lever 25 to pivot bearing 19 about its vertical axis during the period when the tube 8 is released by chuck 1. A resilient spring 26, having one end supported on a pin 27 mounted on a bracket 23 and its other end supported on pin 28 mounted on bearing 19, resiliently urges bearing 19 for rotation about shaft 20 in a direction to return the bearing to an at-rest position after shaft 3 moves past lever 25. Rotation of bearing 19 by spring 26 is limited by a stop block 29 mounted, as by screws 30 on bracket 23.

An elongated rod 35 has one end pivotally connected, as at 36, to plate 17 at a point spaced laterally from arm 18, and has its other end pivotally supported for rotation about a vertical axis by a suitable pin 37 and bracket 38. Bracket 38 is supported on a mounting block 39 by screws 40 extending through elongated slots 41. Mounting block 39 is rigidly supported on bracket 23 by suitable means such as screws 42. The length of rod 35 and the position of pivot axes 36 and 37 with respect to the vertical axis of shaft 20 are such that, upon rotation of bearing 19 about the vertical axis of shaft 20, rod 35 will cause axial sliding movement of arm 18 through linear bearing 19 simultaneously with any rotation of bearing 19. This sliding movement is resisted by a coil tension spring 43 extending between a pin 44 on arm 18 and bearing 19, and is such that, upon rotation of the bearing 19 by shaft 3, a point on plate 17 directly beneath the chuck 1 will be caused to traverse a path closely conforming to the path traversed by the bottom end of the glass tube 8 supported in the chuck. Thus, since tube supporting plate and the soft end of glass tube are cauesd to move along corresponding paths simultaneously with the chuck, the glass tube will not be caused to tilt within the chuck during the body length gauging operation. Further, since tilting of the glass tube is virtually eliminated, friction between the tube and the plate 17 when the chuck is closed is minimized and deformation of the soft end of the glass tube is avoided.

While we have disclosed a preferred embodiment of our invention, we wish it understood that we do not intend to be restricted solely thereto, but that we do intend to cover all embodiments thereof which would be apparent to one skilled in the art and which come within the spirit and scope of our invention.

We claim:

1. In an ampule making machine having a tube holding chuck, means supporting said chuck for movement in an endless horizontal path past successive work stations including along said path a station for severing successive segments from the lower end of a vertically disposed glass supply tube held in said chuck preparatory to forming said segments into ampules, a body length gauging station receiving said glass supply tube from said severing station after each segment has been severed therefrom and while said glass supply tube remains held in said chuck, means operative in response to arrival of said chuck at said body length gauging station for initiating downward axial advancement of said supply tube from said chuck, a body length engaging device at said body length gauging station having a gauging plate defining a horizontally disposed surface in a normal rest position in underlying vertically spaced alignment with said chuck held supply tube and intercepting and regulating the extent of downward axial advancement thereof, the improvement including means operatively supporting said gauging plate for oscillating pivotal movement of said gauging plate about a first fixed vertical axis in a horizontal path leading to and from said rest position and for concurrent sliding movements toward and away from said first vertical axis, means for actuating said gauging plate supporting means to pivot said gauging plate about said first vertical axis from said rest position with said chuck along a portion of said horizontal path during said downward axial advancement of said supply tube, and an elongated connecting rod means having one end mounted for rotation about a second vertical axis spaced from said first vertical axis and having its other end operatively connected to said gauging plate supporting means for actuating said plate radially toward and away from said first vertical axis concurrently with pivotal movement of said gauging plate supporting means about said first vertical axis and for guiding said gauging plate along a path of travel vertically underlying and horizontally paralleling the path of travel of said tube holding chuck during downward axial advancement of said supply tube and throughout contact with said supply tube.

2. In an ampule making machine according to claim 1 wherein said body length engaging device further includes resilient means biasing said plate supporting means for pivotal movement toward said normal rest position.

3. In an ampule making machine according to claim 2 wherein said body length engaging device further includes resilient means biasing said plate for radial sliding movement toward said first vertical axis.

4. In an ampule making machine according to claim 1 wherein said plate supporting means comprises a linear bearing, means supporting said bearing for rotation about said first vertical axis, an elongated arm supported by said bearing for rotation therewith and for linear sliding movement therethrough toward and away from said first axis, and means mounting said plate on said arm for movement therewith.

5. In an ampule making machine according to claim 4 wherein said elongated connecting rod means has one end pivotally connected to said plate at a point spaced laterally from said elongated arm when said gauging plate is in said normal rest position.

6. In an ampule making machine according to claim 4 wherein said means on said gauging plate supporting means for engaging said chuck supporting means includes an elongated lever rigidly supported on said linear bearing and projecting beneath said plate in position to be engaged by said chuck driving means upon movement of chuck along said horizontal path adjacent said plate.

7. In an ampule making machine according to claim 6 wherein said body length engaging device further includes resilient means biasing said plate supporting means for pivotal movement toward said normal rest position.

8. In an ampule making machine according to claim 7 wherein said body length engaging device further includes resilient means biasing said plate for sliding movement toward said first vertical axis.

References Cited

UNITED STATES PATENTS 2,718,731  9/1955   Hughes, Jr., et al. _____ 65—280
3,222,157  12/1965  Dichter _____ 65—280

ARTHUR D. KELLOGG, Primary Examiner

U.S. Cl. X.R.
65—276, 323

PO-1050
(5/69)

UNITED STATES PATENT OFFICE
CERTIFICATE OF CORRECTION

Patent No. 3,560,184            Dated February 2, 1971

Inventor(s) WILLIAM E. HUGHES and CHARLES A. PORTER

It is certified that error appears in the above-identified patent and that said Letters Patent are hereby corrected as shown below:

Col. 2, line 12, "chunk" should be ---chuck---; Col. 2, line 38, "carrier" should be ---carried---. Col. 3, line 19, "cauesd" should be ---caused---.

Signed and Sealed this

Twelfth Day of April

[SEAL]

Attest:

RUTH C. MASON
Attesting Officer

C. MARSHALL DANN
Commissioner of Patents and Trade